Dec. 30, 1969     D. B. TODD     3,486,743

MULTISTAGE VAPOR-LIQUID CONTACTOR

Filed June 16, 1967     2 Sheets-Sheet 1

INVENTOR:
DAVID B. TODD
BY
Dawson, Tilton, Falloy & Lungmus
ATT'YS

Dec. 30, 1969  D. B. TODD  3,486,743

MULTISTAGE VAPOR-LIQUID CONTACTOR

Filed June 16, 1967  2 Sheets-Sheet 2

INVENTOR:
DAVID B. TODD
BY
Dawson, Tilton, Fallon Lungmus
ATT'YS

United States Patent Office 3,486,743
Patented Dec. 30, 1969

3,486,743
MULTISTAGE VAPOR-LIQUID CONTACTOR
David B. Todd, Park Ridge, Ill., assignor, by mesne assignments, to Baker Perkins, Inc., Saginaw, Mich., a corporation of New York
Filed June 16, 1967, Ser. No. 646,546
Int. Cl. B01d 47/12, 47/16; B04b 5/00
U.S. Cl. 261—83                                    11 Claims

ABSTRACT OF THE DISCLOSURE

A centrifugal countercurrent vapor-liquid contactor is provided having a plurality of vertically spaced contacting zones where in each zone is provided with a contacting rotor and the zones are connected in series so that the vapor travels sequentially through the zones and the rotors from lower to upper and the liquid travels sequentially through the zones and rotors from upper to lower. The vapor and liquid therefore are subjected to repeated countercurrent contacting. Each rotor comprises a top and bottom wall connected by a plurality of perforated radially spaced plates. Vapor passage means in the central portions of the top wall. Vapor inlet means communicates with the peripheral portion of the lower of the zones. Vapor outlet means communicates with the upper passage means in the upper rotor. Liquid inlet means supplies liquid to the upper rotor. Baffle wall means extends from the vessel means radially inward between the contact zones and the rotor and includes means providing a radial liquid conducting channel open to the space around the outermost perforated plate. Axially extending tubular means forms a continuation of the vapor passage means projecting upward above the baffle wall means at the inner portion thereof. The tubular means includes means channeling the liquid from the channel to the inner portion of the lower rotor. Liquid removal means communicates with the peripheral portion of the lower of the zones.

Background

Centrifugal contacting apparatus employing concentric perforated rings as the contacting elements have been employed commercially for many years in liquid-liquid contacting operations, such as in the extractive recovery of penicillin and other liquid-liquid extractions. While it has frequently been proposed that similar centrifugal apparatus could be employed for vapor-liquid contacting, the application of such apparatus to this operation has been very limited. The principles of liquid-liquid contacting as employed in centrifugal contactors are not readily adaptable to vapor-liquid contacting.

A considerable advance in the art of vapor-liquid contacting was made with the development of the apparatus described in W. J. Podbielniak United States Patent No. 3,233,880, issued Feb. 8, 1966, for Continuous Centrifugal Vapor-Liquid Contactor. However, the stage capacity of this contactor is limited by the safe permissible maximum diameter of the rotor for a given rotational speed. Moreover, for effective contacting within the confines of a single rotor, it was found necessary to employ specially designed contacting elements having inwardly extending lips or weirs around each of the openings in the contacting elements.

The invention

The present invention utilizes certain of the elements of the vapor-liquid contactor of prior Patent 3,233,880, but arranges these elements in such a manner that a virtually unlimited stage capacity can be provided. Instead of utilizing a single rotor operating on a horizontal shaft, the contactor of the present invention utilizes a plurality of rotors operating on a vertical shaft. A plurality of superposed or stacked contacting zones is provided, each zone containing a rotor which in itself provides a plurality of contacting stages. By utilizing suitable dynamic liquid seals and baffles or barriers between the zones, the vapor to be contacted can be introduced at the bottom of the contactor, and passed sequentially through each of the rotors, traveling from the outside to the inside of a particular rotor, and then upwardly to the next zone for travel from the outside to the inside of that rotor, etc. Also, the liquid can be introduced to the inner portion of a rotor in an upper zone, and will travel outwardly through the rotor by virtue of centrifugal force, and it can then be collected and transferred to the inner portion of the rotor in the next lower zone, again passing outwardly through the rotor, etc. Unless auxiliary liquid or vapor outlets are provided, the vapor would then be removed from above the uppermost zone, and the liquid would be removed from below the lowermost zone. Such a design, as will subsequently be described in greater detail, permits the utilization of a single vertically-extending pressure vessel having a single vertical shaft extending through the central portion thereof, each of the rotors being mounted for rotation on the shaft, and means being provided externally to the vessel for rotating the shaft, and thereby the rotors within each of the contacting zones. Other advantages and modifications of the contactor will be set out in the more complex description which follows.

The drawings

A contactor embodying the design principles of the present invention is illustrated in FIGURE 1 of the attached drawing, this figure showing a sectional elevational view of the contactor.

Detailed description

Figure 1:
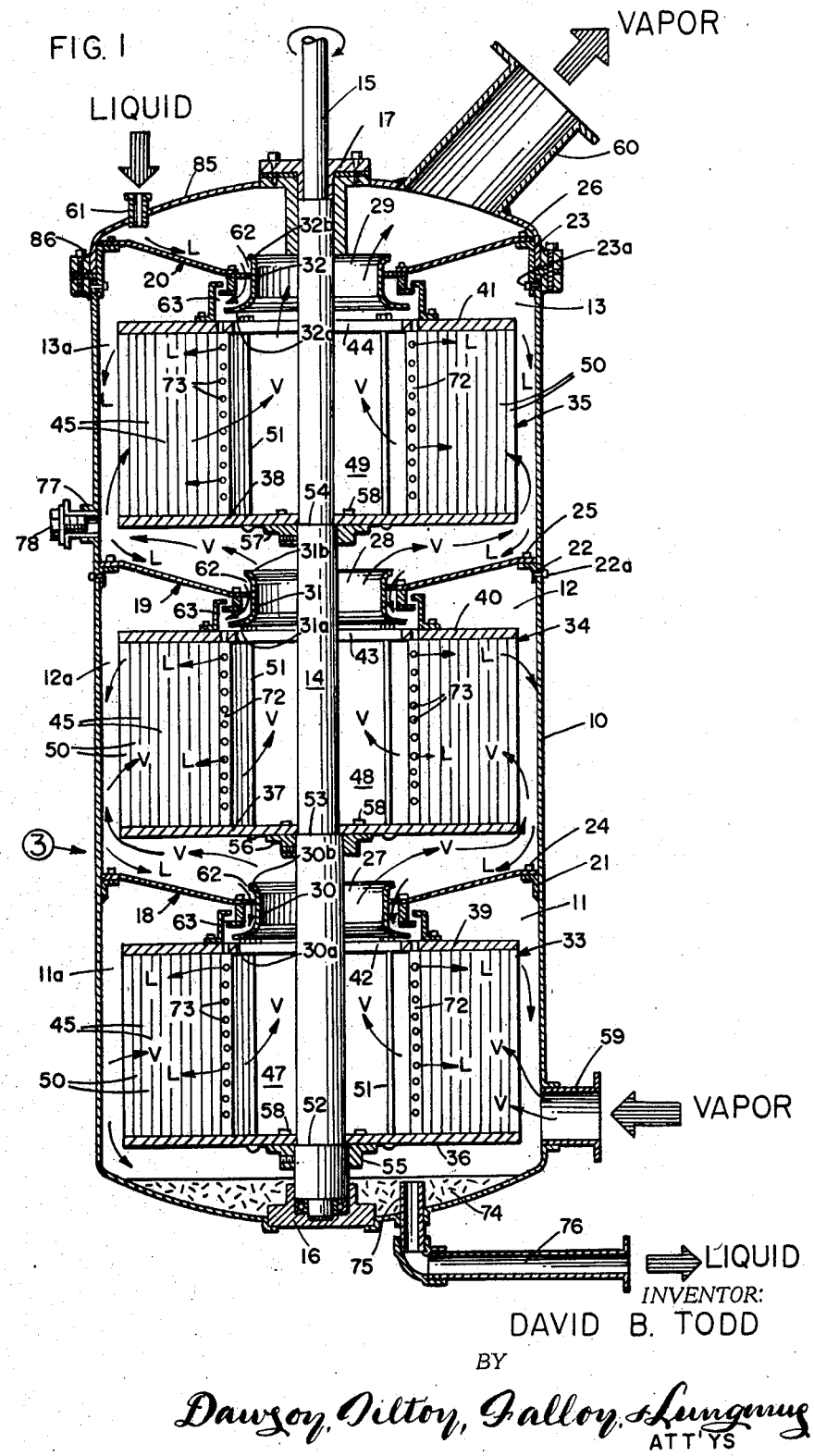

Looking first at FIGURE 1, there is shown an apparatus for the continuous countercurrent contacting of a liquid with a vapor or gas. In the preferred embodiment shown, there is provided an upwardly-extending hermetically-sealed, stationary vessel or tank providing interiorly at least two vertically spaced contacting zones. In the illustration given three vertically spaced contacting zones 11, 12 and 13 are provided. While at least three zones are advantageous, in some embodiments only two vertically spaced zones can be used, while in others four, five or six vertically spaced zones can be used. As previously indicated, the number of zones can be increased to provide whatever stages are required for a particular vapor-liquid contacting operation, or some of the stages can be used for contacting the vapor with a different liquid, or for removing entrained liquid from the vapor before it exits from the vessel.

A rotatably supported shaft 14 extends vertically along the center line of tank 10 and through the central portions of the contacting zones 11, 12 and 13. Shaft 14 includes a driving extension 15 which projects externally of the vessel for connection to a suitable source of rotational power (not shown). The lower end of shaft 14 is supported by a thrust bearing assembly 16, while the upper end is journaled in a bearing assembly 17. It will be understood that these bearing assemblies should be constructed so as to maintain a pressure tight seal to prevent the passage of either liquid or vapor through the bearings to the exterior of tank 10, or the entrance of air from the atmosphere to the interior of the tank.

In accordance with the present invention, inwardly-extending partition means are mounted above the contacting zones. In the illustration given, the partition means are designated generally by the numbers 18, 19 and 20, these partitions respectively overlying the upper portions of the contacting zones 11, 12 and 13. The outer portions of the partition means provide a barrier to vertical liquid and vapor flow. Preferably, as shown, the partition means 18, 19 and 20 slope downwardly and inwardly. For example, they may be of a conical or dished configuration.

The outer peripheral portions of the conical barriers provided by partition means 18, 19 and 20 are removably secured, respectively, to the annular support flanges 21, 22 and 23 by means of suitable detachable bolts 24, 25 and 26. Similarly the flanges 22 and 23 can be removably attached to the walls of vessel 10 by bolts 22a and 23a. Ring 21 can be permanently attached by welding. Additional support means can be provided for the partitions where needed.

The inner portions of the partition means provide an opening through which the shaft 14 extends and also provide vapor passage means. In the illustration given, the vapor passages are respectively designated by the numbers 27, 28 and 29. These vapor passages surround the shaft 14, having an annular cross-section, and being bounded on their outside respectively by the tubular baffles 30, 31 and 32. To assist in directing the liquid flow and maintaining a separation between the liquid and vapor flows, the tubular baffles may be provided with curved outwardly-extending lips, such as the bottom lips 30a, 31a and 32a and the upper lips 30b, 31b and 32b. The specific construction illustrated is shown more clearly in FIG. 2.

A cylindrical rotor is mounted coaxially on shaft 14 within each of the contacting zones and extends from the inner to the outer portions thereof. As shown, the rotors are designated generally by the numbers 33, 34 and 35, these rotors respectively being within the zones 11, 12 and 13. The rotors have substantially closed horizontally-extending lower walls, such as the walls 36, 37 and 38. They also have upper horizontally-extending walls having substantially closed outer portions, such as the walls 39, 40 and 41. The inner portions of the upper walls provide passage or opening means communicating with the adjacent one of the vapor passage means. For example, central opening 42 in upper walls 39 is arranged for communication with vapor passage 27, opening 43 in wall 40 with vapor passage 28, and opening 44 in wall 41 with vapor passage 29.

Within each rotor there is also provided a plurality of perforated cylindrical elements extending between the upper and lower walls in horizontally spaced relation. Since these elements are substantially identical in construction except for a difference in diameter, they are all designated by the number 45. As shown more clearly in FIG. 2, the cylindrical elements 45 are provided with a multiplicity of perforations or ports 46, which are preferably distributed both across and around the cylinders, while being radially offset from cylinder to cylinder to minimize direct liquid or vapor channeling. Advantageously, as shown, the innermost cylinder can terminate at an outwardly spaced distance from the shaft 14 to provide respectively, central, annular, vapor collection spaces 47, 48 and 49 in the rotors 33, 34 and 35. As shown, vapor space 47 communicates with opening 42, while space 48 communicates with opening 43, and space 49 with opening 44. In certain applications, it may be desirable to provide perforations 46 with inwardly extending lips or weirs as described in said Patent 3,233,880.

The arrangement of the perforated cylinders 45 just described provides within each rotor a series of annular passages 50, which connect radially through the perforations 46. The perforations 46 in the innermost of the elements 45 are in vapor flow communication with the opening means of its respective rotor. For example, vapor passing inwardly through the perforations in the innermost element 45 of rotor 33 passes to opening 42 through vapor space 47, or with respect to rotor 34 the vapor passing through the innermost ring 45 passes to opening 43 through vapor space 48. Similarly, the vapor passing through the innermost cylinder of rotor 35 passes to opening 44 through space 49.

The perforations 46 in the outermost of the elements 45 are in vapor and liquid flow communication with the peripheral portion of each contacting zone, respectively, with peripheral portions 11a, 12a and 13a. These peripheral zone portions are adjacent the vertical inner wall of vessel 10, which permits the wall to assist in directing the vapor and liquid flows.

Figure 2:
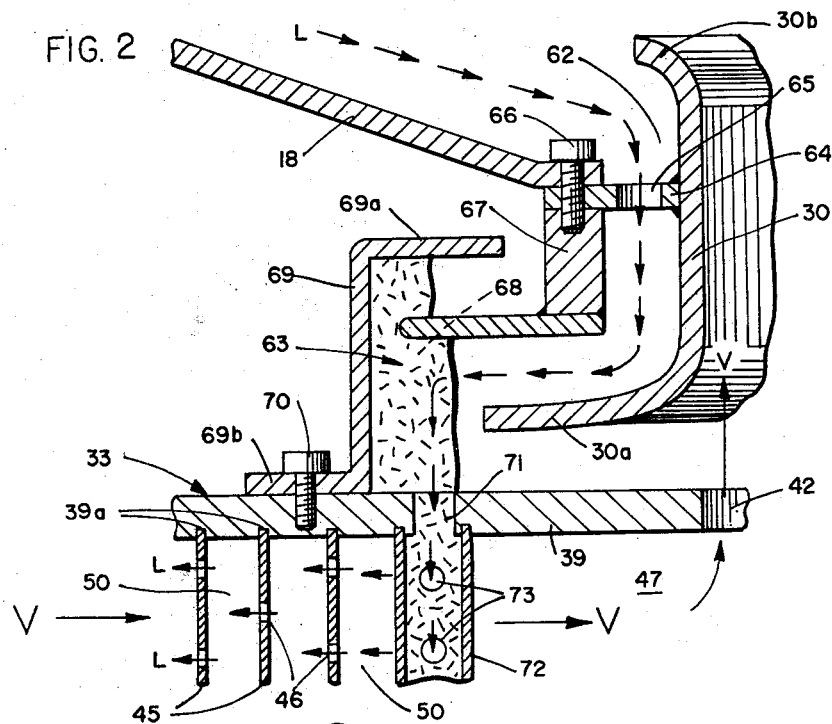
FIGURE 2 is an enlarged fragmentary view of a portion of the apparatus of FIG. 1, the view showing a portion of the liquid collection and transverse means including the dynamic liquid seal.

It will be understood that the rotors 33, 34 and 35 can be assembled and mounted in various ways. Preferably, as indicated in FIG. 2, the upper and lower walls of the rotor are provided with circular grooves for receiving and holding the ends of the cylindrical elements 45, such as the grooves 39a which are shown as provided in the upper wall 39 of rotor 33. As shown, the upper and lower walls or plates can be releasably secured with the elements 45 in place by means of detachable tie rods 51.

To provide a secure mounting for the rotors, while permitting the upward removal of the rotors from shaft 14, the shaft may be progressively turned down to provide step shoulders 52, 53 and 54. As shown in FIG. 1, the bottom walls, 36, 37 and 38, can be respectively provided with central openings which snugly receive the reduced portions of the shaft immediately above the adjacent annular shoulders 52, 53 and 54. As shown, removable support collars 55, 56 and 57 are respectively provided on shaft 14 immediately below and in supporting contact with the bottom walls 36, 37 and 38. The support collars can be releasably keyed to the shaft 14 so that they are held in a fixed position thereon, and the adjacent portions of the bottom walls are releasably connected to the dollars. For example, the attachment may be by means of removable bolts 58. It will be understood, however, that these detailed constructions can be varied.

A vapor inlet means such as the supply conduit 59 communicates with the peripheral portion 11a of the lower contacting zone 11. The vapor thus supplied passes into the rotor 33 toward the shaft 14 through the perforated elements 45.

Vapor outlet means such as the exhaust conduit 60 communicates with the vapor passage means 29 of the upper partition means 20. As will be noted, vapor outlet 60 communicates with the space above the upper partition 20 which closes the outer portion of the upper conforated elements 45.

Liquid inlet means such as the liquid supply connection 61 is arranged to supply liquid to the inner portion of the upper rotor 35. While this may be accomplished in various ways, one advantageous construction is illustrated. The liquid entering through connection 61 is discharged onto the upper surface of partition 20 and flows downwardly thereon toward the outside of tubular baffle 32, which is arranged to direct the liquid through a passage 62 into a dynamic liquid seal 63. Since this arrangement is substantially the same for all of the partition means, reference may be had to FIG. 2 for a clearer understanding of the construction. As there shown, the tubular baffles, such as the baffle 30, are rigidly secured to an outwardly-extending ring 64 which is provided with a plurality of circumferentially spaced perforations 65. The outer edge portions of rings 64 are releasably secured to the inner edge portions of the partition means, such as the partition 18, by means of bolts 66, which also connect to and support an annular baffle 67 having an outwardly-extending foot portion 68. The liquid flow passage 62 is therefore defined between the outer wall of baffle 30 and the inner wall of baffle 67 including the inner wall of foot portion 68. The direction of liquid flow is indicated by the arrows in FIG. 2. As will be noted, the liquid is directed into an annular pocket provided by the retainer 69, which has an inwardly extending upper portion 69a that overlaps foot portion 68. Retainer 69 also provides an outwardly-extending bottom flange 69b, which is releasably mounted on the upper wall of the rotor, such as upper wall 39 by means of bolts 70.

The arrangement just described provides the dynamic liquid seal 63 previously referred to. By virtue of the centrifugal force generated by the movement of the rotors, the liquid flowing downwardly through the passages 62 is directed into the pockets provided by the retainer 69 and captivated therein. The depth of the captivated liquid in the dynamic seals should be controlled so that the outer end portions of the members 68 are within the liquid seal, as illustrated in FIG. 2. At angularly spaced positions around the upper walls of the rotor, such as the wall 39, there are provided liquid outlet openings 71 communicating with the lower portions of the dynamic seals 63, as shown in FIG. 2. For example, the openings 71 can be located at symmetrically or equally spaced divisions around the rotor, that is, two, four, six or more of the openings 71 can be provided. To maintain the liquid seal at all flow volumes of operation, it is important that the outermost portions of the openings 71 be inwardly of the outermost portions of the sealing feet 68. In FIG. 2, the liquid seal 63 is shown as it would appear at a greater than minimum flow rate where the liquid is built up within the seal to substantially cover the opening 71.

In communication with the lower sides of each of the openings 71, there are provided distribution tubes 72 which have vertically spaced outlet openings 73, as shown more clearly in FIG. 2. With this arrangement, the liquid will flow from the seals 63 through the openings 71 into the tubes 72 for discharge through the openings 73 into the inner portions of the rotors for outward flow through the elements 45 due to the centrifugal force of rotation. It will be understood that the elements 45 will interrupt the direct outward flow of the liquid, causing it to also flow circumferentially within the annular spaces 50. This will promote the liquid-vapor contacting within the annular spaces of the rotors.

As the liquid completes its flow through each of the rotors, it will be thrown outwardly against the adjacent walls of the vessel 10, and will run downwardly along these walls by the action of gravity onto the upper surfaces of the partitions, such as the partitions 18 and 19. The vessel walls and the partitions thereby serve for the collection and transfer of the liquid, the liquid passing downwardly from the peripheral portion of the upper zone to the inner zone of the rotor of the next lower zone. The liquid collection and transfer means therefor also includes the passages 62 and the dynamic seals 63, as well as the openings 71, and the distributor tubes 72. While these elements are preferred for providing the liquid collecting and transfer means, other constructions can be utilized which accomplish the same purpose.

Below the lowermost contacting zone there is provided liquid collection and removal means. In the illustration given, this consists of a liquid collection sump 74 which is provided by the bottom portion of vessel 10 in connection with the standpipe 75 into which the liquid in sump 74 overflows for removal through outlet conduit 76. As can be seen in FIG. 1, collection sump 74 communicates with the peripheral portion 11a of the lower zone 11. Liquids thrown outwardly from the outer portion of rotor 33 will collect on the adjacent wall of vessel 10 and run downwardly into sump 74, and this does not interfere with the introduction of the vapor through inlet 59.

In the embodiment of FIG. 1, the contacting zones are arranged so that the vapor introduced into the lowermost zone 11 passes sequentially through the rotors in each of the zones, and is removed from the uppermost zone 13. Similarly, the liquid introduced into the upper zone 13 passes sequentially through the rotors in each of the zones and is removed from the lowermost zone 11. It will be understood that within each of the rotors, the overall flow of the liquid and vapor is countercurrent, the vapor moving inwardly while the liquid moves outwardly. For certain specialized contacting operations, a second liquid inlet means can be provided, and arranged to communicate with the inner portion of a lower one of the rotors. For example, as shown in FIG. 1, a second liquid inlet connection 77 is located in the wall of vessel 10 immediately above the middle partition 19. If desired, closure plug 78 can be removed, and a liquid supply conduit connected to inlet 77 to discharge liquid onto partition 19 for transfer to the interior of rotor 34 by means previously described. The liquid introduced through connection 77 might be an auxiliary reagent or treating liquid, which would combine with the liquid introduced through the top inlet 61. However, inlet 77 may be used as an alternate to inlet 61, that is, inlet 61 would be closed, and the liquid introduced only through the inlet 77. This could be desirable where only two of the rotors are needed to provide the required stages, or where a problem of liquid entrainment in the vapors is encountered. By introducing liquid only through connection 77, the upper rotor 35 would not perform any substantial vapor-liquid contacting, but would only serve to remove entrained liquid from the vapor as it passes to the final outlet 60.

Under other specialized conditions of operation, it may be desirable to provide a second liquid collection and removal means which is arranged to communicate with the peripheral portion of an upper one of the contacting zones. At the same time, there can also be provided a second liquid inlet means communicating with the inner portion of the rotor in the neck zone below the zone from which the second liquid removal means is provided. One construction of this type is illustrated in FIG. 3.

Figure 3:
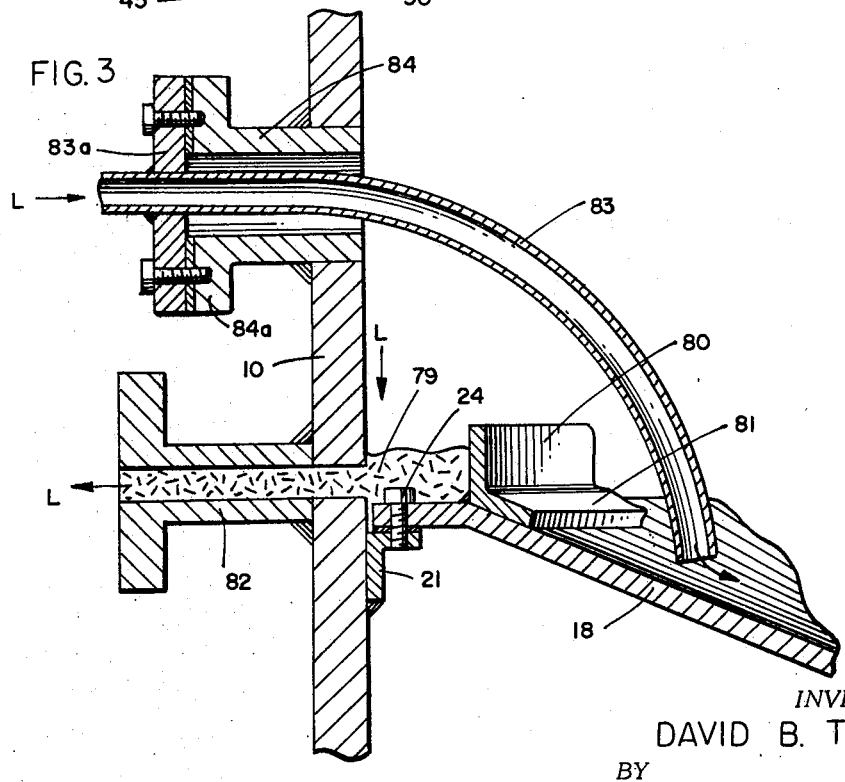
FIGURE 3 is an enlarged fragmentary sectional view of a modification of the apparatus of FIG. 1 which may be incorporated in the apparatus at the point indicated by the No. 3 arrow in FIG. 1, this modification being used where an auxiliary liquid inlet and removal is desired.

The modification of FIG. 3 can be incorporated immediately above any of the partition means which are arranged between contacting zones, for example, immediately above the partition 18, as indicated by the No. 3 reference arrow. The construction of FIG. 3 could also be incorporated in the apparatus immediately above the partition 19 in a similar position to the alternate inlet 77.

As shown in FIG. 3, an annular liquid collection sump 79 is provided adjacent vessel wall 10 immediately above the outer peripheral portion of the partition 18 by means of an annular dam 80 which has an upwardly-extending ring portion and a lower flange 81 that rests on and is attached to partition 18. An outlet connection 82 is provided which communicates through an opening in vessel wall 10 to the sump 79 for removal of the liquid. For introduction of a second liquid there is provided an inlet tube 83 which extends through an opening in wall 10 over dam 80 to discharge on the downwardly inclined portion of partition 18. As shown, the connector 84 is secured to and extends through wall 10, and provides an outer flange 84a to which is removably and sealingly attached a mounting flange 83a which is connected to and supports the tube 83. With this arrangement, the liquid introduced through the upper line 61 can be removed after passing through the upper contacting zones 13 and 12, and a new liquid introduced for passage thhrough the lower contacting zone 11. The vapor introduced at 59 will thereby be contacted with two different liquids before it traverse of the contacting apparatus and is discharged at 60.

The method of operation as well as the procedure for assembling and disassembling the apparatus of FIG. 1 will be apparent from the foregoing discussion. The flow of the liquid and vapor phases through the rotor-equipped zones has been indicated by arrows and by the use of the letters "L" for liquid and "V" for vapor. Since the vessel 10 extends vertically, it will be understood that adequate external support means or bracing will be provided for holding the vessel in this position. However, since such support means does not form part of the present invention, it has been omitted in the drawing.

In disassembling the apparatus, the cover 85 can be first removed by detaching the bolts 86. This will leave the partition 20 and the support flange 23 in place. The tubular baffle 32 which carries the annular baffle 67 (see FIG. 2) can then be detached from partition 20 by removing the bolts 66, the baffles 32–67 being lowered to temporarily rest on top of the rotor plate 41. The partition 20 is then removed by unscrewing the bolts 23a, thereby exposing the rotor 35 for removal by lifting it upwardly off of the top of shaft 14, after the release of bolts 58. The support collar 57 is then removed in a similar fashion. The annular support flange 23 is also removed to permit partition 19 to be lifted out of the open upper end of the vessel 10. The other lower elements of the apparatus are then sequentially removed by a similar procedure for each baffle assembly and rotor, except that the support collar 21 above the lowermost zone may be left in place. After all of the rotors have been removed, shaft 14 can be lifted out of bearing 16 and removed from the vessel. Where desired, intermediate bearing supports can be provided for shaft 14 between bearings 16 and 17.

I claim:

1. Apparatus for the continuous countercurrent contacting of a liquid and a vapor comprising:
   (a) vertically extending vessel means providing interiorly at least two vertically spaced contacting zones:
   (b) rotatably supported shaft means extending vertically through the central portions of said contacting zones;
   (c) rotor means mounted on said shaft means within each of said contacting zones and extending from the inner to the outer portions thereof, said rotor means comprising a top and bottom wall connected by a plurality of perforated radially spaced plates surrounding said shaft means to provide a series of connected surrounding contacting spaces, there being vapor passage means in the central portions of the top walls;
   (d) vapor inlet means communicating with the peripheral portion of the lower of said zones for passing the vapor radially inwardly;
   (e) vapor outlet means communicating with the vapor passage means in the upper rotor means;
   (f) liquid inlet means for supplying liquid to the upper of said rotor means for outward passage through the connected contacting spaces while the vapor flows radially inwardly through them;
   (g) baffle wall means extending from said vessel means radially inwardly between said zones and the rotor means therein and including means providing a radial liquid conducting channel open to the space around the outermost perforated surrounding plate of the rotor means above to receive liquid expressed centrifugally through the upper of said rotor means radially outwardly;
   (h) axially extending tubular means forming a continuation of said vapor passage means projecting upwardly above said baffle wall means at the inner portion thereof and including means channeling the liquid from said channel to the inner portion of the lower of said rotor means radially outwardly of said vapor passage means;
   (i) and liquid removal means communicating with the peripheral portion of the lower of said zones.

2. The apparatus of claim 1, wherein said vessel provides at least three of said vertically spaced contacting zones; each of said contacting zones having means for introducing vapor into a lowermost portion, means for passing the vapor sequentially through each rotor, means for removing vapor from an uppermost portion, means for introducing liquid into an uppermost portion, means for passing the liquid sequentially through each rotor, and means for removing the liquid from a lowermost portion.

3. The apparatus of claim 1 wherein said axially extending means comprises a tubular throat supported by said baffle wall means; there being passage means provided for liquid to pass from said baffle wall means to a radial outer surface of said tubular throat and on to the lower contacting zone.

4. The combination defined in claim 3 in which the passage means for liquid includes openings in said top wall of the lower of said rotor means leading to the inner portion of the lower contacting zone.

5. In an apparatus for continuous counter-current contacting of a liquid and a vapor, the combination of:
   (a) an upwardly extending, hermetically sealed, stationary vessel providing interiorly at least two vertically spaced contacting zones;
   (b) a rotatably supported shaft extending vertically through the central portions of said contacting zones and including a driving extension projecting exteriorly of said vessel;
   (c) inwardly extending partition means mounted above said contacting zones.
      the outer portions of said partition means providing a barrier to vertical liquid and vapor flow,
      the inner portions of said partition means providing an opening through which said shaft extends and also providing vapor passage means;
   (d) a cylindrical rotor mounted coaxially on said shaft within each of said contacting zones and extending from the inner to the outer portions thereof,
      said rotors having horizontally extending lower walls having outer portions and opening means provided by their inner portions in communication with the adjacent one of said vapor passage means, and a plurality of perforated cylindrical elements extending between said upper and lower walls in horizontally spaced relation to provide a series of connected annular contacting spaces,
         the perforations in the innermost of said elements being only in vapor flow communication with the said opening means of its respective rotor, and the perforations in the outermost of said elements being in vapor and liquid flow communication with the peripheral portion of its respective zone;
   (e) vapor inlet means communicating with the said peripheral portion of the lower of said zones;
   (f) vapor outlet means communicating with the said vapor passage means of the upper of said partition means;
   (g) liquid inlet means for supplying liquid to the inner portion of the upper of said rotors for outward passage through the rotor while said vapor flows inwardly from the peripheral portion of the upper zone;
   (h) liquid collecting and transfer means for passing liquid downwardly from the peripheral portion of said upper zone to the inner portion of the rotor in the next lower zone, said liquid collecting and transfer means including a liquid releasing portion dispensed inwardly of the perforated cylindrical elements for passing liquid outwardly through the rotor while said vapor flows inwardly from the peripheral portion of said lower zone, said liquid collecting and transfer means including said partition means extending radially inwardly between said zones and the rotors therein and including means to provide a liquid channel along its upper surface open to the space surrounding the outermost cylindrical element of the rotor above; and (i) liquid collection and removal means communicating with the peripheral portion of the lower of said zones.

6. The apparatus of claim 5 wherein said vapor passage means is provided in part by a tubular baffle surrounding said shaft and spaced outwardly therefrom, said baffle being carried by the inner portion of the adjacent one of said partition means.

7. The apparatus of claim 5 wherein a dynamic centrifugal liquid seal is provided between the inner portions of said partition means and the said rotor upper walls, said liquid seal being part of said liquid collecting and transfer means, and said liquid collecting and transfer means also including means for supplying liquid to the liquid seal from above its respective partition wall and means for passing liquid from the liquid seal to the inner portion of the next lower rotor.

8. The apparatus of claim 5 wherein a second liquid inlet means is provided which communicates with the inner portion of a lower one of said rotors.

9. The apparatus of claim 5 wherein a second liquid collection and removal means is provided communicating with the peripheral portion of an upper one of said zones.

10. The apparatus of claim 5 wherein a second liquid collection and removal means is provided communicating with an upper one of said zones, and wherein there is also provided a second liquid inlet means communicating with the inner portion of the rotor in the next zone below said upper one of said zones.

11. The apparatus of claim 5 wherein at least the said partition means between said zones slope downwardly and inwardly for collecting and transferring liquid from the outer to the inner portions thereof, said partition means also including means for collecting and transferring liquid from the inner portion of said sloping partition means to the inner portion of the rotor in the next lower zone.

References Cited

UNITED STATES PATENTS

| | | |
|---|---|---|
| 2,189,230 | 2/1940 | Sheldon et al. |
| 2,480,215 | 8/1949 | Bowden et al. |
| 3,233,880 | 2/1966 | Podbielniak _____ 261—83 |

RONALD L. WEAVER, Primary Examiner

U.S. Cl. X.R.

23—270.5; 202—158; 233—15